United States Patent [19]

Aihara et al.

[11] Patent Number: 5,173,992
[45] Date of Patent: Dec. 29, 1992

[54] RELEASABLE DOUBLE-HINGE DEVICE FOR AN AUTOMOBILE CONSOLE BOX

[75] Inventors: Masahiro Aihara; Hiroyuki Suzuki, both of Yokohama, Japan

[73] Assignee: Kato Hatsujo Kaisha, Ltd., Yokohama, Japan

[21] Appl. No.: 783,673

[22] Filed: Oct. 29, 1991

[30] Foreign Application Priority Data

Jan. 10, 1991 [JP] Japan .................................. 3-18220

[51] Int. Cl.⁵ ............................................ E05D 15/50
[52] U.S. Cl. .................................. 16/232; 16/DIG. 23
[58] Field of Search .................. 16/231, 232, DIG. 23

[56] References Cited

U.S. PATENT DOCUMENTS

| | | | |
|---|---|---|---|
| 1,272,594 | 7/1918 | Wolter | 16/231 |
| 1,381,335 | 6/1921 | Reed | 16/231 |
| 3,628,217 | 12/1971 | Schaber et al. | |
| 3,724,021 | 4/1973 | Lautenschlaeger, Jun. | |
| 3,728,819 | 4/1973 | Goldbach et al. | |
| 3,772,736 | 11/1973 | Hettich et al. | |
| 3,977,043 | 8/1976 | Zernig | |
| 3,978,549 | 9/1976 | Vitt | |
| 4,126,964 | 11/1978 | Anderson | |

Primary Examiner—John Sipos
Assistant Examiner—Carmine Cuda
Attorney, Agent, or Firm—Foley & Lardner

[57] ABSTRACT

A double-hinge device according to the invention enables the lid of a console box to be smoothly opened from either of a pair of opposite edges from a closed position or conversely closed and locked form an open position by a simple operation. A shaft 3 is arranged along each of the opposite edges of the main body 1 of the console box and an engagement/release mechanism 4 is arranged to the corresponding edge of the lid 2. The shaft 3 is securely embraced by pivotally arranged primary arm 4a and secondary arm 4b under the effect of the resilient force of a return spring 5 fitted between the primary arm 4a and the lid 2. The movement of the secondary arm 4b is dependent on that of the primary arm 4a when the latter is operated to release the shaft from the primary and secondary arms 4a and 4b and open the lid. The lid can be closed simply by pushing it downward until the shaft 3 abuts primary and secondary inclined end surfaces 4k, 4l of a recessed area 6 then opens the primary and secondary arms 4a and 4b against the resilient force of the return spring 5 so that the shaft 3 is embraced by the arms.

2 Claims, 4 Drawing Sheets

RELEASABLE DOUBLE-HINGE DEVICE FOR AN AUTOMOBILE CONSOLE BOX

BACKGROUND OF THE INVENTION

1. Applicable Field of Industry

This invention relates to a releasable double-hinge device to be suitably used for the lid of an automobile console box or of an electric rice boiler or the door of a cabinet in order for the lid or the door to be capable of being opened from either of opposite ends and totally removed.

2. Prior Art

As shown in FIG. 7 of the accompanying drawings, an automobile is normally provided at a side of the driver's seat a with a console box b for storing small items having a lid c which is preferably hinged not only at the front end d but also at the rear end e for user's convenience.

FIGS. 8(A) and 8(B) show that the lid of the console box is hinged at both the front and rear ends and therefore can be swung open in the direction of not only arrow f but also arrow g. FIG. 8(C) shows that the lid C can be totally removed from the console box whenever necessary FIGS. 9(A) and 9(B) show known releasable double-hinge devices to be used for such a console box.

With a known releasable double-hinge device as illustrated in FIG. 9(A) and disclosed in Japanese Patent Tokkai Shou No. 60-242275, the box main provided at a side as well as at the opposite side with a pair of oppositely arranged lock holes i, into which a pair of lock pins k arranged on the corresponding side of the lid j can be respectively introduced firstly by depressing them by means of a hand-operated implement (not shown) against the resilient force of a built-in spring and thereafter by releasing them into the respective holes. Obviously, such operation is cumbersome as it requires manipulation of an implement particularly when the lid j is removed because both hands should be used for the operation.

With another known releasable double-hinge device as illustrated in FIG. 9(B) and disclosed in Japanese Patent Jitsukai Shou No. 60-90042, the box main body 1 is provided at each of a pair of opposing sides with a pair of oppositely arranged pins m and n, which are received by respective C-shaped deformable bearings p or q arranged on the corresponding edges of the lid o. The lid o equipped with such a double-hinge device would not rotate smoothly when the engagement between the pin and the bearing is loose, whereas it should be removed and put back in position with considerable effort if a smoothly rotatable engagement is to be achieved between the pin and the bearing.

A similar device disclosed in Japanese Patent Jitsukai Hei No. 1-86674 involves a lever to be operated for installing a lid. While a door lock device designed for a refrigerator and disclosed in Japanese Patent Tokkai Shou No. 59-52183 and a door fitting in Japanese Patent Tokkai Shou No. 58-86277 may fall in the same category of device in question, they have a rather complicated configuration involving latches, springs and knobs.

In view of the problems and disadvantages of the known devices, it is therefore a first object of the first aspect of the present invention to provide a releasable double-hinge device for an automobile console box constituted by a box main body having at the top an opening and a box lid for removably covering the opening of the box main body, said device comprising a pair of shafts arranged along a pair of opposite edges of the box main body and a pair of engagement/release mechanisms arranged along the corresponding respective edges of the lid, each of said engagement/release mechanisms further comprising a pivotally arranged primary arm, a pivotally arranged secondary arm and a return spring, said primary and secondary arms having a scissor like arrangement, the lid being held to its closed position as the shaft is embraced by the primary and secondary arms of each engagement/release mechanism under the effect of the resilient force of the return spring.

A second object of the first aspect of the invention is to make the lid capable of being easily and smoothly opened and rotated around one of the shafts embraced by the corresponding engagement/release mechanism by simply moving upward the primary arm of the other engagement/release mechanisms to release the corresponding shaft.

A third object of the first aspect of the invention is to make the lid capable of being easily and smoothly closed and held to a locked condition by simply pushing dow the lid to make the primary and secondary arms to open and then embrace the corresponding shaft under a locked condition and also to make the lid capable of being totally removed from the box main body by simply moving up the two primary arms simultaneously.

The object of the second aspect of the invention is to provide a double-hinge device similar to the one described above relative to the first aspect of the invention and also having a pair of additional coil springs arranged around the respective secondary arms in order to hold the arms constantly under a locked condition so that the lid may be securely held to its closed position and would not be unintentionally opened by any pitching or rolling movement.

SUMMARY OF THE INVENTION

According to the present invention, the objects of the first aspect of the invention are achieved by providing a releasable double-hinge device for an automobile console box constituted by a box main body having at the top an opening and a box lid for removably covering the opening of the box main body, said device comprising a pair of shafts arranged along a pair of opposite edges of the box main body and a pair of engagement/release mechanisms arranged along the corresponding respective edges of the lid and releasably engaged with the respective shafts, each of said engagement/release mechanisms further comprising a primary arm and a secondary arm respectively and pivotally arranged around primary and secondary pins and suspending from said respective pins to cross with each other, said primary and secondary arms respectively having at the upper portion a primary transmission section and a secondary transmission section, said transmission sections abutting each other, at the lower portion primary shaft holding curved surface and a secondary shaft holding curved surface for releasably embracing the shaft and at the free lower end a primary locking tip connected to a primary inclined end surface and a secondary locking tip connected to a secondary inclined end surface, said engagement/release mechanism further comprising a return spring arranged between the primary arm and the lid for securely holding the primary arm to a closed position, said primary arm having a stopper for abutting said secondary locking tip to limit the closing motion of said secondary arm, the lid being rotated around the shaft arranged along an edge of the box main body and opened from its closed position by moving upward the primary arm of the engagement-/release mechanism of the opposite edge against the resilient force of the related coil spring to produce a gap between the primary and secondary locking tips by transmitting the power applied to the primary arm to the secondary transmission section by way of the primary transmission section and to make the engagement-/release mechanism releasable from the shaft, the lid being closed from its open position by pushing down the lid to bring the recessed area formed by the crossing primary and secondary inclined end surfaces of the engagement/release mechanism to abutment with the shaft and to further open the primary and secondary arms against the resilient force of the return spring and the rotary moment of the arms until the shaft becomes embraced by the primary and secondary shaft holding curved surfaces to firmly close the lid.

According to the present invention, the object of the second aspect of the invention is achieved by providing a releasable double-hinge device for an automobile console box constituted by a box main body having at the top an opening and a box lid for removably covering the opening of the box main body as described above relative to the first aspect of the invention and further comprising a primary return spring between the lid and the primary arm and the lid and a secondary return spring between the lid and the secondary arm of each of the engagement/release mechanisms so that the recessed area formed by the crossing primary and secondary inclined end surfaces of the engagement/release mechanism of an opened edge of the lid is brought to abutment with the shaft and the primary and secondary arms are further opened against the resilient force of the primary and secondary return springs until the shaft becomes embraced by the primary and secondary shaft holding curved surfaces to firmly close the lid.

With such an arrangement, the lid may be opened from either side.

The lid of the console box may be totally removed when the above described operation of opening the lid is conducted simultaneously at both edges where the engagement/release mechanisms are arranged.

While only the primary arms of a double-hinge device according to the first aspect of the invention are harnessed by return springs and the secondary arms can be freely pivoted relative to the respective primary pins, both the primary and secondary arms of a double-hinge device according to the second aspect of the invention are harnessed by return springs and therefore the secondary arms would not be freely pivoted relative to the respective primary pins so that a recessed area is constantly maintained for each engagement/release mechanism and any danger of unintentionally releasing the engagement between the engagement/release mechanisms and the respective shafts may be eliminated.

Now, the present invention will be described in greater detail by referring to the accompanying drawings that illustrate a preferred embodiment of the invention.

DETAILED DESCRIPTION OF THE INVENTION

Figure 1:
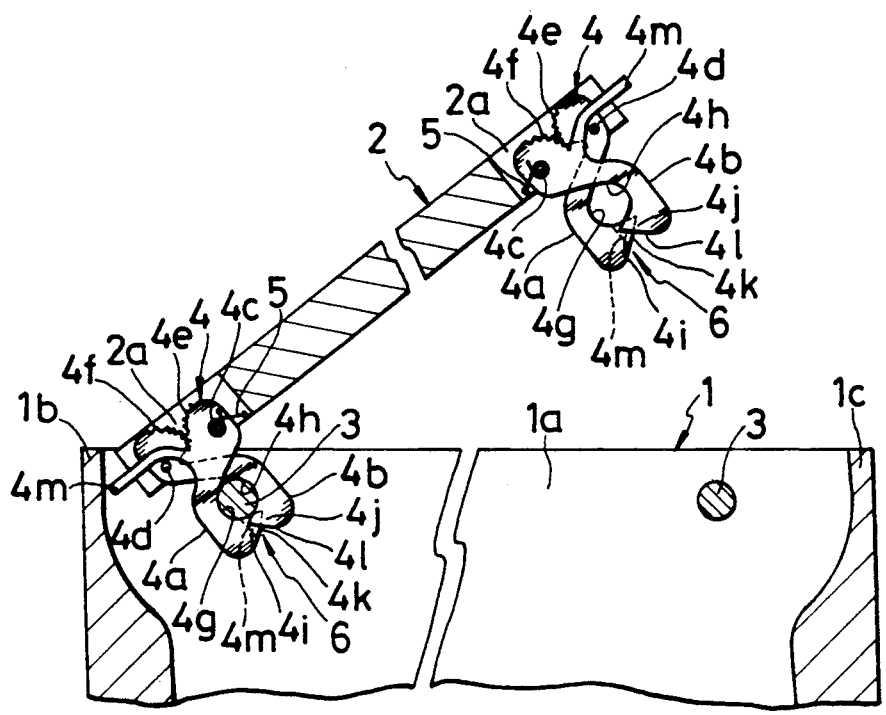
FIG. 1 is a sectional front view of a preferred embodiment of the invention applied to a console box, showing only the principal areas of the console box, where the lid of the box is opened.
Figure 2:
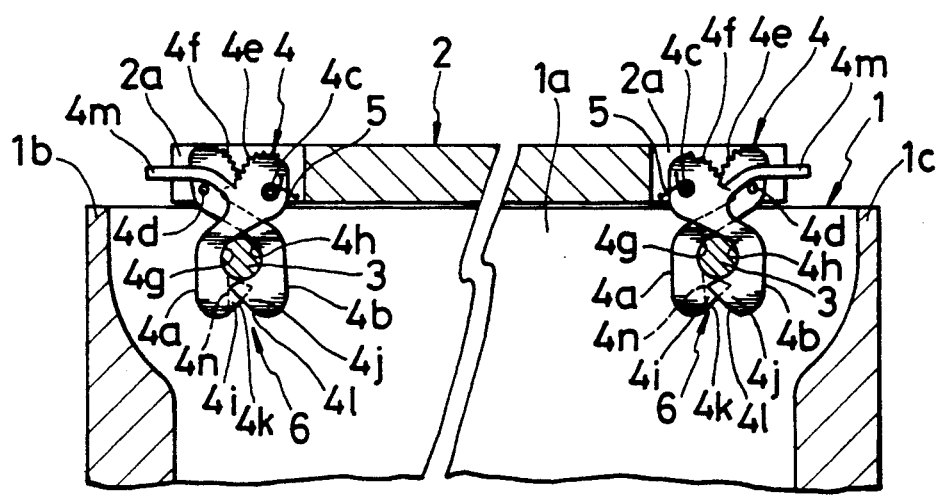
FIG. 2 is another sectional front view of the embodiment of FIG. 1, where the lid of the box is closed.

Referring to FIGS. 1 and 2 showing a preferred embodiment of the invention, reference numeral 1 denotes the main body of a console box having an opening 1a and 2 denotes a lid for removably covering the opening 1a. A pair of lateral shafts 3, 3 are arranged along oppositely disposed respective edges 1b, 1a of the opening 1a of the box main body 1, while a pair of engagement/release mechanisms 4, 4 are arranged along the corresponding respective edges of the lid 2, each of said shafts 3, 3 being combined with corresponding one of the engagement/release mechanisms 4, 4 to form a hinge.

Figure 3:
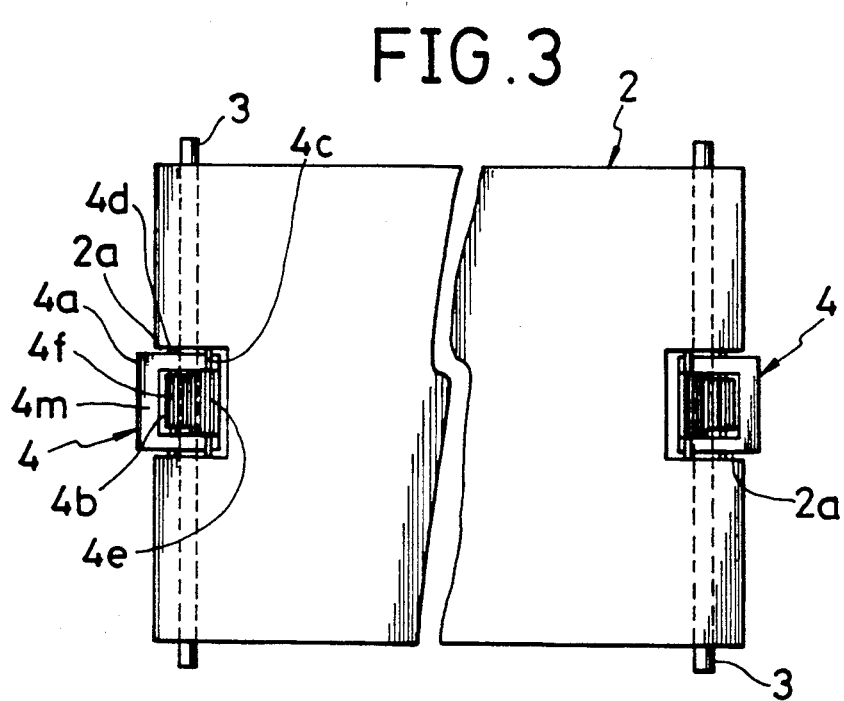
FIG. 3 is a plan view of the lid of the console box of FIG. 1 to which the embodiment is applied.
Figure 4:
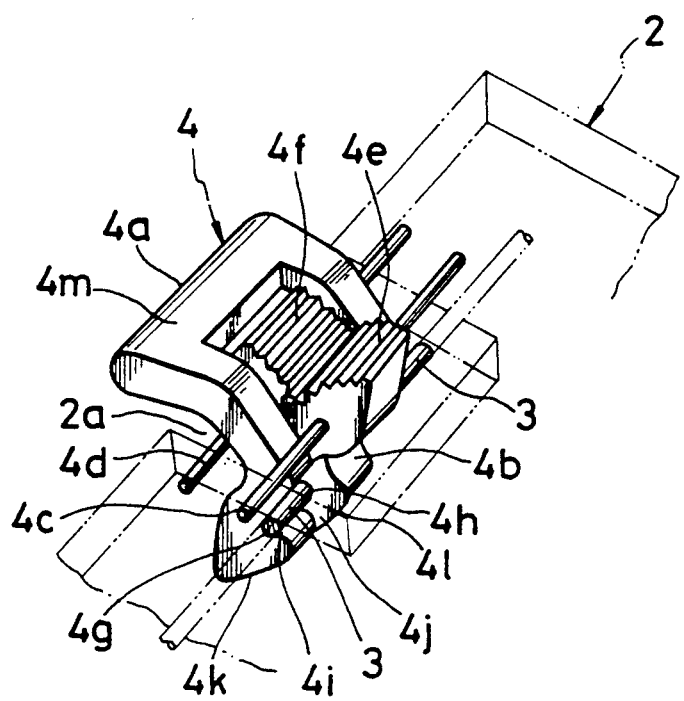
FIG. 4 is a perspective view of the one of the engagement/release mechanisms of the embodiment of FIG. 1.
Figure 5:
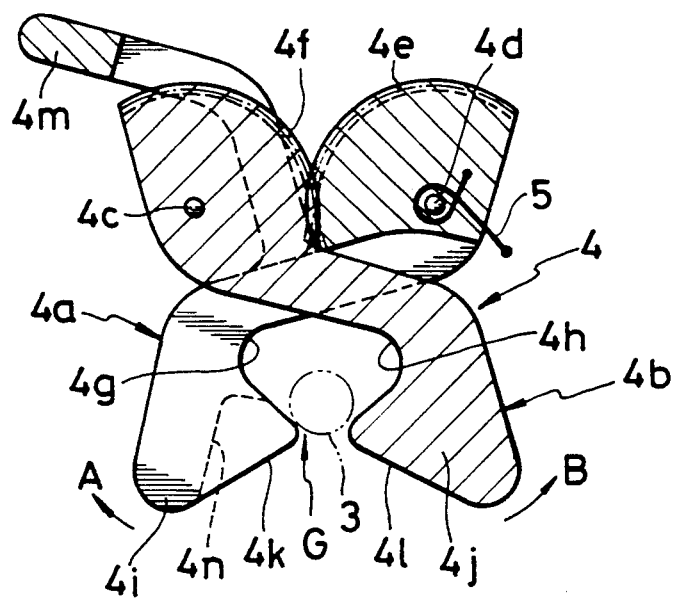
FIG. 5 is a sectional front view of the engagement-/release mechanism of FIG. 4, showing a state where it is opened.

As shown in FIG. 3, said engagement/release mechanisms 4, 4 are received in respective indentations 2a, 2a arranged at the middle of said opposite edges of the box lid 2.

Each of said engagement/release mechanisms 4, 4 comprises a primary arm 4a, a secondary arm 4b combined with said primary arm 4a in crossed manner to operate as a pair of pincers, a primary pin 4c for pivotally holding said primary arm 4a and a secondary pin 4d for pivotally holding said secondary arm 4b, said primary pin 4c and secondary pin 4d being arranged in parallel with the corresponding shaft 3 and securely fitted to the box lid 2.

The primary arm 4a and the secondary arm 4b are provided on the upper surface respectively with a primary transmission section 4e and a secondary transmission section 4f, which are parallel ridges or a similar frictional arrangement for ensuring frictional engagement of the surfaces. They are also provided at a lower portion respectively with a primary shaft holding curved surface 4g and a secondary shaft holding curved surface 4h, which are arranged face to face to securely hold the corresponding shaft 3. The lower end of the primary arm 4a and that of the secondary arm 4b respectively constitute a primary locking tip 4i and a secondary locking tip 4j. The inclined surface between the primary shaft holding curved surface 4g and the primary locking tip 4i and the corresponding inclined surface between the secondary shaft holding curved surface 4h and the secondary locking tip 4j are respectively designated here primary inclined end surface 4k and secondary inclined end surface 4l, which face downward.

The primary arm 4a is provided with a handle 4m which is integral with the primary transmission section 4e and extends outwardly. Said handle 4m has a U-shaped plan view and the secondary transmission section 4f is located within the inner space of the U-shaped handle 4m.

Referring again to FIGS. 1 and 2, a return coil spring 5 is arranged around the primary pin 4c with its one end rigidly fitted to the primary arm handle 4a and the other end to the lid 2 so that said primary arm 4a is normally held to the position shown in FIG. 2. Under this condition, the secondary arm 4b is urged to hold the lid in its closed position by the rotary moment of the secondary pin 4d due to the resilient force of the coil spring and the front extremity of the secondary locking tip 4j abuts a stopper 4n arranged on the primary arm 4a.

Under the normal condition of the device as described above, the primary inclined end surface 4k of the primary arm 4a and the secondary inclined end surface 4l of the secondary arm 4b intersect each other at a position immediately below the shaft 3 to form a recessed area 6. The primary and secondary inclined end surfaces 4k and 4l are preferably tilted by 45° relative to a horizontal line under this condition.

Figure 6:
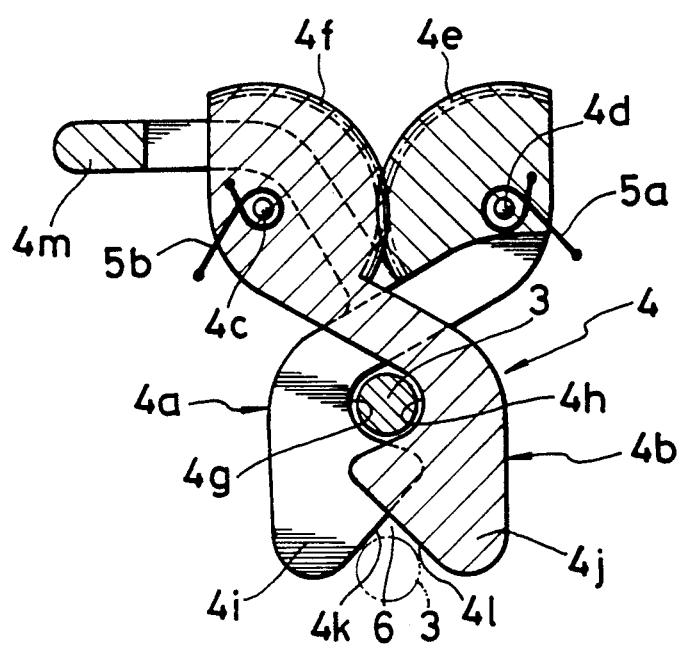
FIG. 6 is a sectional front view of an engagement-/release mechanism obtained by modifying the engagement/release mechanism of FIG. 4, showing a state where it is closed.
Figure 7:
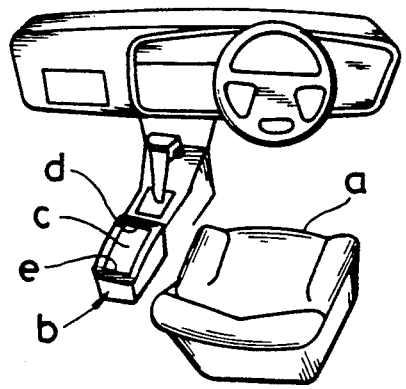
FIG. 7 is a perspective view of a known automobile console box.
Figure 8A:
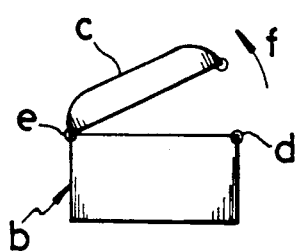
FIG. 8(A), 8(B) and 8(C) are schematic side views of the console box of FIG. 7 showing respectively when it is opened from the right, when it is opened from he left and when the box lid is totally removed.
Figure 8B:
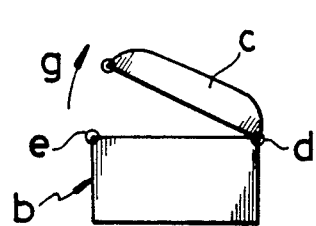
Figure 8C:
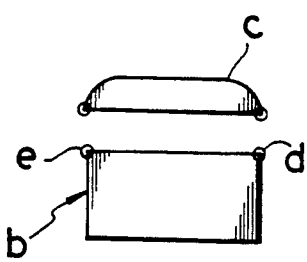
Figure 9A:
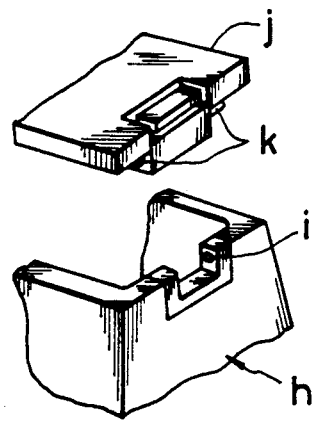
FIG. 9(A) is a partial perspective view of a known console box and FIG. 9(B) is a sectional side view of another known console box.
Figure 9B:
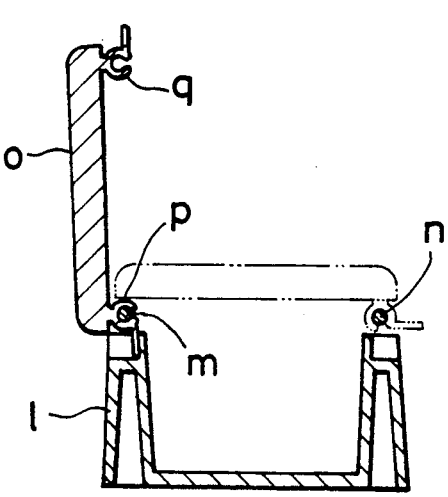

In FIG. 6 showing a modified configuration of the engagement/release mechanism, while a primary return coil spring 5a is arranged around the primary pin 4c with its one end rigidly fitted to the primary arm 4a and the other end to the lid 2 as in the case of FIGS. 1 and 2, a secondary return coil spring 5b is also arranged around the secondary pin 4d of the secondary arm 4b with its one end rigidly fitted to the secondary arm 4b and the other end to the lid 2. With such an arrangement, not only the primary arm 4a but also the secondary arm 4b are urged to hold the lid in the closed portion by the resilient force of the coil springs. Therefore, this modified configuration differs from the configuration of FIGS. 1 and 2 in that the secondary arm 4b is not freely rotatable around the secondary pin 4d.

The lid 2 of a console box provided with a releasable double-hinge device having a configuration as described above is held to its closed position and remains in a locked condition as long as the shafts 3, 3 are firmly caught by the respective engagement/release mechanisms as the primary arms 4a, 4a are held to their normal positions are held to their proper positions by the rotary moment so that the shafts 3, 3 are embraced by the respective combinations of the primary and secondary locking tips 4i, 4j, and 4i, 4j as each combined primary and secondary locking tips 4i, 4j cross with each other.

When the handle 4m of either of the engagement/release mechanisms 4 4, is pushed upward, the primary arm 4a is rotated around its pin in the sense as indicated by arrow A against the resilient of the return spring 5 to turn the secondary transmission section 4f by way of the primary transmission section 4e so that the secondary arm 4b is consequently rotated in the sense as indicated by arrow B to form a gap G between the primary locking tip 4i and the secondary locking tip 4j, through which the shaft can come out.

Therefore, if the handle 4m is lifted further upward, the engagement/release mechanism 4 eventually leaves the shaft 3 and the lid 2 can be rotate around the other shaft which is firmly caught by the other engagement/release mechanism 4 to become open so that the inside of the console box is accessibly through the opening 1a.

When the lid 2 is pushed downward for closing, on the other hand, the shaft 3 comes to abut the primary inclined end surface 4k and the secondary inclined end surface 4l since the arms 4a and 4b of the engagement/release mechanism 4 are in the closed positions respectively due to the resilient force of the coil spring 5 and the rotary moment of the arm 4b. However, the primary and secondary locking tips 4i and 4j are easily rotated in the respective directions of arrow A and B against the resilient force of the coil spring 5 to open and embrace the shaft between the primary shaft holding curved surface 4g and the secondary shaft holding curved surface 4h under a locked condition.

It may be needless to say that the lid 2 may be totally removed from the box main body 1 when both handles 4m, 4m of the engagement/release mechanisms 4, 4 are moved upward simultaneously to release the respective shafts 3, 3.

As is apparent from the above description, since the engagement/release mechanisms of a double-hinge device according to the first aspect of the invention can smoothly rotate around the respective shafts and be easily released from the respective shafts by a simple operation and, moreover, since the primary and secondary arms of each of the engagement/release mechanisms return to the position where they embrace the corresponding shaft to hold the lid of a console box equipped with the device to a closed condition once the operation of opening the lid is terminated, the lid can be easily and quickly opened or closed and, if necessary, it can be completely removed from the box main body by a simple operation.

Since both the primary and secondary arms of each of the engagement/release mechanisms of a double-hinge device according to the second aspect of the invention are provided with a return spring, both arms are firmly held to the normal position without any danger of unintentionally releasing the corresponding shaft, the lid of a console box equipped with the device is firmly held to a closed condition even when the box is subjected to rolling or pitching motion. Either device can be manufactured at relatively low cost as it has a simple configuration. Moreover, it is substantially free from malfunctions and can be repaired easily if it becomes defective.

What is claimed is:

1. A releasable double-hinge device for an automobile console box constituted by a box main body having at the top an opening and a box lid for removably covering the opening of the box main body comprising a pair of shafts arranged along a pair of opposite edges of the box main body and a pair of engagement/release mechanisms arranged along the corresponding respective edges of the lid and releasably engaged with the respective shafts, each of said engagement/release mechanisms further comprising a primary arm and a secondary arm respectively and pivotally arranged around primary and secondary pins and suspended from said respective pins to cross with each other, said primary and secondary arms respectively having at an upper portion a primary transmission section and a secondary transmission section, said transmission sections abutting each other, at a lower portion primary shaft holding curved surface and a secondary shaft holding curved surface for releasably embracing the shaft and at the free lower end a primary locking tip connected to a primary inclined end surface and a secondary locking tip connected to a secondary inclined end surface, said engagement/release mechanism further comprising a return spring arranged between the primary arm and the lid for securely holding the primary arm to a closed position, said primary arm having a stopper for abutting said secondary locking tip to limit the closing motion of said secondary arm, the lid being rotated around the shaft arranged along an edge of the box main body and opened from its closed position by moving upward the primary arm of the engagement/release mechanism of the opposite edge against the resilient force of the related spring to produce a gap between the primary and secondary locking tips by transmitting the power applied to the primary arm to the secondary transmission section by way of the primary transmission section and to make the engagement/release mechanism releasable from the shaft, the lid being closed from its open position by pushing down the lid to bring the recessed area formed by crossing primary and secondary inclined end surfaces of the engagement/release mechanism to abutment with the shaft and to further open the primary and secondary arms against the resilient force of the return spring and the rotary moment of the arms until the shaft becomes embraced by the primary and secondary shaft holding curved surfaces to firmly close the lid.

2. A releasable double hinge device for an automobile console box constituted by a box main body having at the top an opening and a box lid for removably covering the opening of the box main body comprising a pair of shafts arranged along a pair of opposite edges of the box main body and a pair of engagement/release mechanisms arranged along the corresponding respective edges of the lid and releasably engaged with the respective shafts, each of said engagement/release mechanisms further comprising a primary arm and a secondary arm respectively and pivotally arranged around primary and secondary pins and suspended from said respective pins to cross with each other, said primary and secondary arms respectively having at an upper portion a primary transmission section and a secondary transmission section, said transmission sections abutting each other, at a lower portion a primary shaft holding curved surface and a secondary shaft holding curved surface for releasably embracing the shaft and at the free lower end a primary locking tip connected to a primary inclined end surface and a secondary locking tip connected to a secondary inclined end surface, said engagement/release mechanism further comprising a primary return spring arranged between the primary arm and the lid and a secondary return spring arranged between the secondary arm and the lid for securely holding the primary and secondary arms to a closed position, the lid being rotated around the shaft arranged along an edge of the box main body and opened from its closed position by moving upward the primary arm of the engagement/release mechanism of the opposite edge against the resilient force of the related primary and secondary springs to produce a gap between the primary and secondary locking tips by transmitting the power applied to the primary arm to the secondary transmission section by way of the primary transmission section and to make the engagement/release mechanism releasable from the shaft, the lid being closed from its open position by pushing down the lid to bring the recessed area formed by crossing primary and secondary inclined end surfaces of the engagement/release mechanism to abutment with the shaft and to further open the primary and secondary arms against the resilient force of the return springs and the rotary moment of the arms until the shaft becomes embraced by the primary and secondary shaft holding curved surfaces to firmly close the lid.

* * * * *